US008825706B1

(12) United States Patent
Hudock, Jr.

(10) Patent No.: US 8,825,706 B1
(45) Date of Patent: Sep. 2, 2014

(54) SYSTEM FOR AND METHOD OF PROCESSING BUSINESS PERSONNEL INFORMATION

(71) Applicant: Carnegie Research, Inc., San Jose, CA (US)

(72) Inventor: Robert Hudock, Jr., San Jose, CA (US)

(73) Assignee: Carnegie Research, Inc., San Jose, CA (US)

( * ) Notice: Subject to any disclaimer, the term of this patent is extended or adjusted under 35 U.S.C. 154(b) by 0 days.

(21) Appl. No.: 13/651,027

(22) Filed: Oct. 12, 2012

Related U.S. Application Data

(62) Division of application No. 11/880,219, filed on Jul. 19, 2007, now Pat. No. 8,326,878.

(51) Int. Cl.
*G06F 17/30* (2006.01)

(52) U.S. Cl.
CPC .................................... *G06F 17/30* (2013.01)
USPC ............ 707/791; 707/802; 707/822; 707/600

(58) Field of Classification Search
CPC ...................................................... G06F 17/30
USPC ................................................ 707/600–899
See application file for complete search history.

(56) References Cited

U.S. PATENT DOCUMENTS

| | | | |
|---|---|---|---|
| 6,175,831 | B1 | 1/2001 | Weinreich et al. |
| 6,697,807 | B2 | 2/2004 | McGeachie |
| 7,047,244 | B2 | 5/2006 | McGeachie |
| 7,069,308 | B2 | 6/2006 | Abrams |
| 2002/0147701 | A1 | 10/2002 | Chang |
| 2003/0158856 | A1 | 8/2003 | Nishigaya et al. |
| 2004/0158576 | A1 | 8/2004 | Chen et al. |
| 2005/0004813 | A1 | 1/2005 | Gvelesiani |
| 2006/0287987 | A1 | 12/2006 | McGeachie et al. |
| 2007/0271232 | A1 * | 11/2007 | Mattox et al. .................... 707/3 |
| 2009/0024428 | A1 | 1/2009 | Hudock, Jr. |

OTHER PUBLICATIONS

Capital-IQ Platform Overview, pdf, viewed on web Jun. 19, 2006, pp. 1-2, Published by Capital-IQ (www.capitaliq.com).
Capital-IQ Search Results, Report from product demonstration which took place on Oct. 12, 2006, pp. 1-9, Provided by Capital-IQ (www.capitaliq.com).
The Many Faces of Social Networking, Newsletter, received via email on Nov. 3, 2006, pp. 1-2, Provided by InfoCommerce Group (www.infocommercegroup.com).

(Continued)

*Primary Examiner* — Isaac M Woo
(74) *Attorney, Agent, or Firm* — Westberg Law Offices

(57) ABSTRACT

Information for personnel of a plurality of business organizations is collected. For each person, the information includes the name of the person, the identity of a business organization that the person currently works for and biographical information containing any affiliations identified for the person. Information for a plurality of affiliations is collected and a table of the affiliations is generated, the table of affiliations being stored in computer-readable storage. From the collected information, a data structure is generated and is stored in computer-readable storage. The first data structure includes an entry for each match between the biographical information of a person and an affiliation included in the table of affiliations. A query of a user may be responded to by executing a computer-implemented process on the first data structure. Results of the query are displayed for the user.

11 Claims, 11 Drawing Sheets

Personnel Table 300

| Personnel ID | Company | Division | Title | First Name | Last Name | Age | Raw Biography | Biography |
|---|---|---|---|---|---|---|---|---|
| 1 | Cisco | | SVP, Global Government Solutions and Corporate Security Programs | Bradford J. (Brad) | Boston | 52 | Brad Boston runs the Global Government Solutions Group (CGSG) at Cisco Systems to advise government customers on business practices and technology solutions... | (Note: Once the Raw Biography has been processed and hyperlinks attached it is then loaded into the Biography field.) |
| 2 | Oracle | Applications | Vice President, Global Human Resources Management Systems | Deepjot | Chhabra | | Deepjot Chhabra is Vice President of Global Human Resources Management Systems (HRMS) product development within the Applications division at Oracle Corp... | |
| 3 | Oracle | | Director | Michael D. | Capellas | 52 | Mr. Capellas has been a member of the Board of Directors since January 2006. From November 2002 to January 2006, he served as CEO of... | |
| 4 | Oracle | | VP, Consumer Packaged Goods, Oracle Products Industry | Phillip (Phil) | Friedman | | Phil Friedman brings more than 30 years of experience in engineering, information technology and business management to his role as vice president, consumer... | |

(56) References Cited

OTHER PUBLICATIONS

Aley, T., Today's Companies Can Combine . . . , Article, dated Apr./May 2007, pp. 19-21, Published by Software & Information Industry Association (www.siia.net).
Alacra, Web pdf, publication date (unknown), pp. 1-2, Published by Alacra (www.alacra.com).
Welcome to BoardEx, Web page, viewed on web Sep. 6, 2007, p. 1, Published by (www.boardex.com).
Branch It Corporate Solution, Web page, viewed on web Sep. 6, 2007, p. 1, Published by (www.branchit.com).
What is Vshake?, Web page, viewed on web Sep. 6, 2007, p. 1, Published by (www.vshake.com).
Branch It Overview, Web page, viewed on web Mar. 9, 2009, p. 1, Published by (www.branchit.com).
ZoomInfo for Sales Intelligence, Web page / pdf, publication date (unknown), pp. 1-2 Published by (www.zoominfo.com).
Zoom Information Inc—PowerSearch Overview, Web page / pdf, publication date (unknown), pp. 1-2, Published by (www.zoominfo.com).

* cited by examiner

Personnel Table 300

| Personnel ID | Company | Division | Title | First Name | Last Name | Age | Raw Biography | Biography |
|---|---|---|---|---|---|---|---|---|
| 1 | Cisco | | SVP, Global Government Solutions and Corporate Security Programs | Bradford J. (Brad) | Boston | 52 | Brad Boston runs the Global Government Solutions Group (CGSG) at Cisco Systems to advise government customers on business practices and technology solutions... | (Note: Once the Raw Biography has been processed and hyperlinks attached it is then loaded into the Biography field.) |
| 2 | Oracle | Applications | Vice President, Global Human Resources Management Systems | Deepjot | Chhabra | | Deepjot Chhabra is Vice President of Global Human Resources Management Systems (HRMS) product development within the Applications division at Oracle Corp... | |
| 3 | Oracle | | Director | Michael D. | Capellas | 52 | Mr. Capellas has been a member of the Board of Directors since January 2006. From November 2002 to January 2006, he served as CEO of... | |
| 4 | Oracle | | VP, Consumer Packaged Goods, Oracle Products Industry | Phillip (Phil) | Friedman | | Phil Friedman brings more than 30 years of experience in engineering, information technology and business management to his role as vice president, consumer... | |

*FIG. 3A*

| Personnel ID | Company | Division | Title | First Name | Last Name | Age | Raw Biography | Biography |
|---|---|---|---|---|---|---|---|---|
| 5 | Verizon | Wireless | VP, Video Programming and Content Marketing and Strategy | Terry | Denson | | Denson served as most recently and vice president of programming networks, development of analog, digital, video-on-demand... | |
| 6 | Verizon | | SVP Internal Auditing | Joleen D. | Moden | | Joleen moden is senior vice president-internal Auditing for Verizon, responsible for risk assessment and internal audits throughout the company and its... | |
| 7 | Verizon | | VP Workplace Culture, Diversity, and Compliance | Magda | Yrizarry | | As vice president of Workplace Culture and Compliance, Magda Yrizarry leads Verizon's award winning diversity, ethics and workplace programs. Yrizarry... | |
| 8 | Wal-Mart | | EVP, President and CEO, Global Procurement Division | Lawrence V. | Jackson | 52 | Lawrence is responsible for the Global Procurement Division, which includes purchasing offices in 28 countries around the world and an ethical standards... | |

*FIG. 3B*

Affiliations Table 400

| Affiliations |
| --- |
| American Express |
| AT&T |
| Cisco |
| Ernst & Young |
| General Electric |
| Harvard University |
| IBM |
| Oracle |
| Verizon |
| Wal-Mart |

FIG. 4A

Nicknames Table 402

| Affiliations | Nicknames |
| --- | --- |
| IBM | International Business Machines |
| IBM | Big Blue |
| University of California, Santa Cruz | UC Santa Cruz |
| University of California, Santa Cruz | University of California at Santa Cruz |
| University of Maryland | Maryland University |
| University of Southern California | USC |
| University of St. Andrews | St. Andrews University |
| University of St. Thomas | St. Thomas University |
| US Airways | USAirways |
| Veolia Environnement | Veolia |
| VINCI | SGE |
| VION | Sovion |
| Virgin Group | Virgin Atlantic |
| Virgin Group | Virgin Blue |
| Virgin Group | Virgin Entertainment |
| Virgin Group | Virgin Active |
| Volt Information Sciences | Volt |
| Walgreens | Walgreen |
| Walt Disney | Disney |

FIG. 4B

Personnel Affiliations Table 500

| Personnel ID | Affiliation |
|---|---|
| 1 | American Express |
| 1 | Harvard University |
| 1 | United Way |
| 1 | IBM |
| 2 | Princeton University |
| 2 | Pepsi Co. |
| 3 | US Senate |
| 4 | University of Washington |
| 5 | US Navy |

Compare Two Companies (Cisco and Oracle) 700

| One Degree of Separation | | | | |
|---|---|---|---|---|
| Common Affiliation | Personnel Name | Current Company | Current Position | Biography |
| Cisco | Deepjot Chhabra | Oracle | Vice President, Global Human Resources Management Systems | Deepjot Chhabra is Vice President of Global Human Resources Management Systems (HRMS) product development within the Applications division at Oracle Corp. ... (click here for more) |
| Oracle | Michael D. Cappellas (Age: 52) | Cisco | Director | Mr. Cappellas has been a member of the Board of Directors since January 2006. From November 2002 to January 2006, he served as CEO of... (click here for more) |
| Two Degrees of Separation | | | | |
| Common Affiliation | Personnel Name | Current Company | Current Position | Biography |
| American Express | Phillip (Phil) Friedman | Oracle | VP, Consumer Packaged Goods, Oracle Products Industry | Phil Friedman brings more than 30 years of experience in engineering, information technology and business management to his role as vice president, consumer... (click here for more) |
| American Express | Bradford J. (Brad) Boston | Cisco | SVP, Global Government Solutions and Corporate Security Programs | Brad Boston runs the Global Government Solutions Group (CGSG) at Cisco Systems to advise government customers on business practices and technology solutions... (click here for more) |

*FIG. 7A*

Compare Two Companies (Cisco and Oracle) 700

| Two Degrees of Separation | | | | |
|---|---|---|---|---|
| Common Affiliation | Personnel Name | Current Company | Current Position | Biography |
| AT&T | George Demarest | Oracle | Senior Director, Database Marketing | George Demarest is senior director of Database Marketing in Oracle's Worldwide marketing organization. He is responsible for launch and positioning... (click here for more) |
| AT&T | Sergio Giacolletto (Age: 55) | Oracle | EVP, Europe, Middle East, and Africa and Consulting | Sergio Giacolletto is Executive Vice President of Oracle Europe, Middle East and Africa (EMEA) and serves on Oracle's Executive Management Committee. He... (click here for more) |
| AT&T | Edison Perez | Cisco | VP, Worldwide Channels, Advanced Core Technologies | Perez is responsible for the development and implementation of Cisco's worldwide channel strategy for advanced and core technologies. His primary responsibility... (click here for more) |

*FIG. 7B*

Compare Company (Hewlett-Packard) to indivdual (Brad Anderson: SVP, Product Group-Dell) 800

| One Degree of Separation | | | | |
|---|---|---|---|---|
| Common Affiliation | Personnel Name | Current Company | Current Position | Biography |
| Hewlett-Packard | Brad Anderson (Age: 46) | Dell | SVP, Product Group | Brad Anderson serves as Senior Vice President, Product Group. In this role, he is responsible along with Jeff Clarke for worldwide development, marketing,... (click here for more) |
| **Two Degrees of Separation** | | | | |
| Common Affiliation | Personnel Name | Current Company | Current Position | Biography |
| Harvard University | Brad Anderson (Age: 46) | Dell | SVP, Product Group | Brad Anderson serves as Senior Vice President, Product Group. In this role, he is responsible along with Jeff Clarke for worldwide development, marketing,... (click here for more) |
| Harvard University | Debra L. Dunn (Age: 48) | Hewlett-Packard | SVP, Corporate Affairs | Debra Dunn has leadership responsibility for HP's global citizenship efforts. These include corporate social and environmental responsibility, government... (click here for more) |

FIG. 8

Affiliation List for a Company (Cheveron) 900

| Affiliation | Personnel Name | Current Position | Biography |
|---|---|---|---|
| American Petroleum Institute | Thomas R. Schuttish (Age: 59) | General Tax Counsel of Chevron | Thomas R. Schuttish is general tax counsel for Chevron Corp. In this capacity, he guides and directs the tax activities throughout the corporation and... (click here for more) |
| Amgen | Donald B. Rice (Age: 67) | Director of Chevron | Dr. Rice has been chairman of the board, president, and CEO of Agensys, Inc., a private biotechnology company, since 1996. Prior Positions Held; Dr. Rice ... (click here for more) |
| Boeing | Lisa Barry | VP and General Manager Government Affairs of Chevron | Barry joins ChevronTexaco from Time Warner, where she held the position of senior vice president, international policy. Prior to Tmie Warner, she served ... (click here for more) |
| Boys & Girls Clubs | Ronald D. Sugar (Age: 58) | Director of Chevron | Dr. Sugar has been chairman of the board, CEO, and president of Northrop Grumman Corporation, a global... (click here for more) |
| Callaway Golf | Samuel H. Armacost (Age: 67) | Director of Chevron | Mr. Armacost has been chairman of SRI International, formerly Stanford Research Institute, an independent... (click here for more) |
| Caltex Australia | Michael K. (Mike) Wirth (Age: 45) | EVP Global Downstream of Chevron | Michael K. (Mike) Wirth is Chevron Corporation's EVP for Global Downstream—a position he assumed in March 2006. He is responsible for directing the company's... (click here for more) |
| Caltex Australia | Jeet S. Bindra (Age: 58) | President, Chevron Global Refining of Chevron | Reliance Petroleum Ltd. elected Jeet Bindra, president of Chevron Global Refining, to its board of directors effective July 21, 2006. Bindra has served ... (click here for more) |

*FIG. 9*

Affiliation Lookup (All Personnel Affiliated with United Way) 1000

| Personnel Name | Current Company | Current Position | Biography |
|---|---|---|---|
| Peter J. Robertson (Age: 59) | Chevron | Vice Chairman and Office of the Chairman | Mr. Robertson has been vice chairman of the board of Chevron since 2002. Prior Positions Held: Mr. Robertson was VP of Chevron from 1994 until 2001. He ... (click here for more) |
| G. Kennedy (Ken) Thompson (Age: 56) | Hewlett-Packard | Director | Ken Thompson is Chairman, President and Chief Executive Officer of Wachovia Corporation. He joined the company ... (click here for more) |
| Jon Stephan DeVann (Age: 45) | Microsoft | SVP, Windows Core Operating System Division | As senior vice president of the Windows Core Operating System Division, Jon DeVann manages the engineering team responsible for creating the core components ... (click here for more) |
| Tami Reller | Microsoft | VP, Business Solutions Marketing Group | Tami Reller is corporate vice president of the Business Solutions marketing group at Microsoft. Reller's global marketing team is responsible for the strategy ... (click here for more) |

FIG. 10

Individual Lookup (John Dragoon)(SVP and Chief Marketing Officer at Novell) 1100

| Biography: |
|---|
| John Dragoon serves as Novell's senior vice president and chief marketing officer. Mr. Dragoon brings over 21 years of high technology operations experience to his role, and is responsible for all aspects of Novell's marketing strategy and activities worldwide, including corporate marketing, field marketing, partner and channel marketing, industry marketing and marketing operations functions. He was most recently vice president of worldwide field marketing for Novell. Mr. Dragoon is a member of Novell's Worldwide Management Committee. Prior to joining Novell, Dragoon was the senior vice president of marketing and product management at Art Technology Group where he was responsible for all aspects of ATG's product plans and strategy, product marketing, and corporate marketing. Before ATG, Dragoon spent more than 16 years at IBM, where he held a number of marketing and sales positions, including director of marketing, IBM Supply Chain Management Solutions. After IBM, Dragoon served as vice president, operations, Internet Capital Group, where he was on the board of nine partner companies providing guidance on strategy, marketing, business development, financing, and product development. Dragoon holds an MBA from Cornell University and a bachelor of science in computer science and economics from Union College. Source: Company Web Site, 2006 |
| Affiliations: |
| Art Technology Group |
| Cornell University |
| IBM |
| Internet Capital Group |
| Union College |

*FIG. 11*

SYSTEM FOR AND METHOD OF PROCESSING BUSINESS PERSONNEL INFORMATION

This application is a divisional of prior application Ser. No. 11/880,219, filed Jul. 19, 2007, the entire contents of which are hereby incorporated by reference.

FIELD OF THE INVENTION

The present invention relates to the field of collecting and processing of information in a database. More particularly, the present invention relates to collecting and processing of business personnel information.

BACKGROUND OF THE INVENTION

Business relationships are often formed and solidified by connecting people with common interests, educational backgrounds, non-profit involvement and/or employment histories. Moreover, business relationships can make the difference between the success or failure of a business venture. Therefore, it can be valuable to identify potential commonalities among personnel of different business organizations. Once identified, these relationships can be leveraged to more effectively conduct a number of business functions such as sales, marketing, recruiting and business development activities.

Conventionally, relationships among personnel of businesses have been identified by manually searching online databases for information about personnel of a particular business organization, reading the information, and attempting to identify relevant relationships from the information. This manual method tends to be prone to errors and omissions and also tends to be time-consuming. Therefore, what is needed is an improved technique for processing business personnel information.

SUMMARY OF THE INVENTION

The invention provides a method and a system for processing business personnel information. In accordance with an embodiment of the method, information for personnel of a plurality of business organizations is collected. For each person, the information includes the name of the person, the identity of a business organization that the person currently works for and biographical information containing any affiliations identified for the person. Information is collected for a plurality of affiliations and a table of the affiliations is generated, the table of affiliations being stored in computer-readable storage. From the collected information, a data structure is generated and is stored in computer-readable storage. The data structure includes an entry for each match between the biographical information of a person and an affiliation included in the table of the affiliations. A query of a user may be responded to by executing a computer-implemented process on the first data structure. Results of the query are displayed for the user.

In accordance with an embodiment of the system, a database stored in computer-readable storage comprises information for personnel of a plurality of business organizations including, for each person, the name of the person, the identity of a business organization that the person currently works for and biographical information containing any affiliations identified for the person. At least a portion of the information of the database is arranged into a data structure having a plurality of entries and each entry comprising an identification of the person and any affiliations identified for the person. A processor executes a plurality of software queries on the information contained in the database in response to input from a user. A display device displays results of the queries.

BRIEF DESCRIPTION OF THE DRAWINGS

The present invention is described with respect to particular exemplary embodiments thereof and reference is accordingly made to the drawings in which:

FIGS. 3A-B illustrate a tabular data structure containing personnel information in accordance with an embodiment of the present invention;

FIGS. 4A-B illustrate tabular data structures containing affiliations and nicknames in accordance with an embodiment of the present invention;

FIGS. 7A-B illustrate a tabular data structure showing results of a process of correlating commonalities among two particular organizations in accordance with an embodiment of the present invention;

FIG. 8 illustrates a tabular data structure showing results of a process of correlating commonalities among a particular organization and a particular person in accordance with an embodiment of the present invention;

FIG. 9 illustrates a tabular data structure showing results of a process of identifying affiliations of personnel of a particular organization in accordance with an embodiment of the present invention;

FIG. 10 illustrates a tabular data structure showing results of a process of identifying personnel associated with a particular affiliation in accordance with an embodiment of the present invention; and FIG. 11 illustrates a tabular data structure showing results of a process of identifying affiliations of a particular person in accordance with an embodiment of the present invention.

DETAILED DESCRIPTION OF THE INVENTION

The present invention provides a system for and a method of processing business personnel information to identify commonalities among the business personnel. This information can be used to form business relationships among identified personnel (e.g. by physically making contact with the personnel by telephone, mail, email or in person). Such relationships can then be used to more effectively conduct a number of business functions such as sales, marketing, recruiting and business development activities. Therefore, the present invention improves upon a business's ability to find commonalities between its staff and another business's staff and to use these identified commonalities to build business relationships for the betterment of the organization. As used herein, the terms "business" and "company" are intended to encompass for-profit business organizations as well as not-for-profit organizations, such as charitable, professional, political, educational or social organizations.

Figure 1:
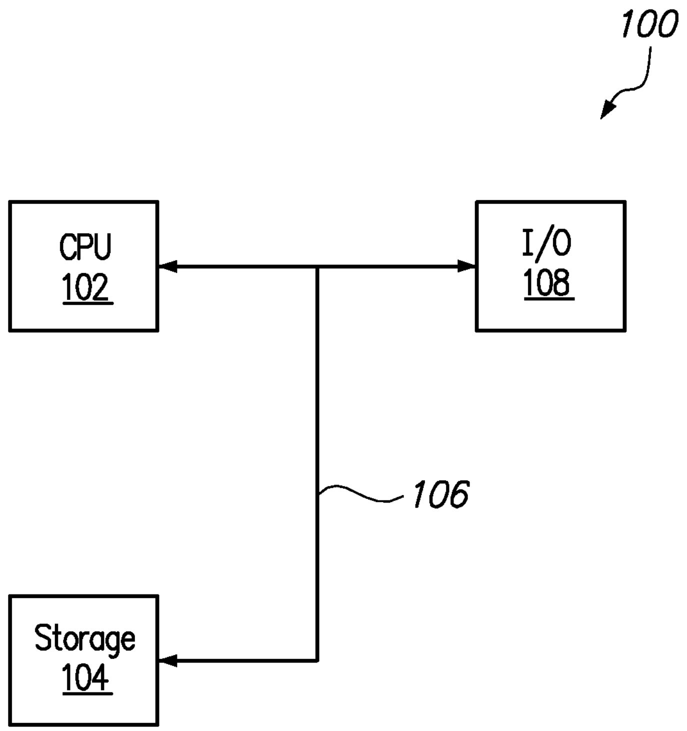
FIG. 1 illustrates a block schematic diagram of general-purpose computer system by which the present invention may be implemented.

FIG. 1 illustrates a block schematic diagram of general-purpose computer system 100 by which the present invention, including portions of the methods described herein, may be implemented. The computer system 100 may include a general-purpose processor 102, a computer-readable storage medium 104, a communication bus 106, and input/output devices 108. The processor 102 executes sequences of computer instructions contained in computer-readable software files. The storage medium 104 may include transitory memory, such as RAM, and persistent storage, such as a magnetic tape, a hard disk, a removable medium (e.g. an optical disk or a magnetic disk), and/or non-volatile RAM. The communication bus 106 provides for transfer of data and control information among elements of the computer system 100. The input/output devices 108 provide an interface for a human operator and/or an interface for connecting the computer system 100 to a network. The input/output devices 108 may include such devices as a keyboard, monitor, mouse, printer and network interface. The computer system 100 itself is conventional. Accordingly, it will be apparent that modifications may be made to the computer system 100 such as including more or fewer elements than shown in FIG. 1 and substituting other elements for those illustrated in FIG. 1. For example, the computer system 100 may employ a plurality of coordinated processors which perform parallel or distributed processing.

The methods disclosed herein may be input to the computer system 100 in the form of computer-readable software files that include computer-executable program steps. The software files may be stored in the computer-readable storage medium 104. The computer system 100 may implement the methods disclosed herein by executing the software files. Further, data structures disclosed herein, including databases, tables, and lists may be stored in computer-readable form in the computer-readable storage medium 104. These data structures may be generated and manipulated during the execution of the computer-readable software files.

Figure 2:
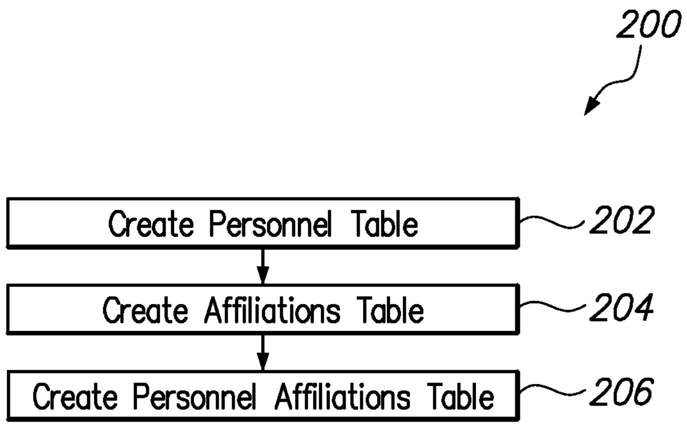
FIG. 2 illustrates a flowchart of a method of processing personnel information in accordance with an embodiment of the present invention.

FIG. 2 illustrates a flowchart of a method 200 of processing personnel information in accordance with an embodiment of the present invention. In step 202, personnel information, such as personnel names, titles, current employer, and biographies, is collected. This step may be performed manually, for example, by a person searching Internet websites, publications and other data repositories and copying the data into the storage medium 104 of the computer system 100. Alternatively, or in addition to manual collection of the data, this step may be performed automatically by computer, such as by executing a software program (e.g. a "web-spider") that browses the Internet, and possibly other data repositories, in an automated and methodical manner.

In an embodiment, the personnel information is arranged as a pipe-delimited list of personnel information in the following format:

company|division|title|firstName|lastName|age|biography

Also in step 202, the personnel information is arranged in a data structure that is stored in a computer-readable storage medium (e.g. the medium 104 of FIG. 1). This data structure includes an entry for each person and information about the person. In a preferred embodiment, the information for each person includes: the identity of the business they currently work for, the business division in which they work, the position or title they currently hold, their first name, last name, age, and biographical information.

FIGS. 3A-B illustrate a tabular data structure 300 containing the personnel information in accordance with an embodiment of the present invention. As shown in FIGS. 3A-B, this data structure 300 (also referred to as the "personnel table") is arranged with one entry or row for each person and with columns for information fields, including "Personnel ID", "Company," "Division," "Title," "First Name," "Last Name," "Age," "Raw Biography," and "Biography." The personnel table 300 may include an entry for every known employee of all businesses for which information can be found. It will be apparent, however, that other selection criteria may be used to determine which individuals are included. In some cases, the information for a particular field is not available or not applicable. In this case, a blank field appears in the table, meaning that the information is either not applicable or is not available. For purposes of explanation and illustration, the personnel table 300 shown in FIGS. 3A-B shows details of only a limited number of entries; however, in a preferred embodiment, the table 300 has a greater number of entries.

The "Raw Biography" column of the table 300 contains biographical information about the person. As shown in FIGS. 3A-B, this biographical information is narrative. However, the information could be presented in another form, such as a list. The biographical information typically originates from sources such as the website of the business for which the person currently works. However, this information can come from other sources or from a combination of sources. In addition, the available biographical information of persons contained in the personnel table 300 is preferably repeatedly monitored for changes and updates. In response, the biographical information in the personnel table 300 is edited and updated. In addition, new entries are repeatedly added to the table 300 as new information becomes available or deleted if no longer accurate.

In a preferred embodiment, raw biographical information contained in the table 300 (FIGS. 3A-B) is "processed," so that the affiliations (described in connection with FIGS. 4A-B) are converted to HTML hyperlinks. The processed biography with hyperlinks may be stored in a "Biography" column in the table 300, as shown in FIGS. 3A-B. This processing may be performed manually or by computer. In addition, the raw biography and or the processed biography may be store elsewhere for archival and retrieval purposes.

In step 204, a table of affiliations and nicknames is generated. The affiliations included in the table 400 may include organizations with the following categories: education (schools and institutions); businesses (present and historical); board memberships and involvement; professional organization memberships and involvement; volunteer and non-profit involvement; and interests (hobbies and activities). This information may be collected from a plurality of sources. For example, a list of businesses may be obtained from government filings and private credit bureau companies that maintain such information. Lists of education organizations may be obtained from a different source or sources such as the Internet. Further, a list of non-profit and professional associations may be obtained from still different sources such as an independent rating group that maintains such data. In a preferred embodiment, the affiliations table 400 contains at least 15,000 entries. This table is also stored in a computer-readable storage medium (e.g. the medium 104 of FIG. 1).

FIG. 4A illustrates a tabular data structure 400 containing affiliations in accordance with an embodiment of the present invention. As shown in FIG. 4A, the data structure or "affiliations table" 400 is arranged with one entry or row for each affiliation. The affiliations table 400 preferably includes an entry for every organization mentioned in the "Raw Biography" column of the personnel table 300 of FIGS. 3A-B. However, because the information contained in the affiliations table 400 also comes from other sources, the affiliations table 400 may contain affiliations not included in any biographical information contained in the Table 300.

In step 204, a table of affiliation nicknames may also be generated. The nicknames are alternative names (i.e. aliases), if any, for each affiliation. FIG. 4B illustrates a tabular data structure 402 containing nicknames for affiliations in accordance with an embodiment of the present invention. As shown in FIG. 4B, the data structure or "nicknames table" 402 includes the name of the affiliations that have identified aliases or nicknames with a separate row for each nickname. For example, "IBM" is an organization listed among the affiliations. Its nicknames are "International Business Machines" and "Big Blue." By associating the nicknames to the corresponding affiliation, each affiliation and its nickname is recognized and treated as a single organization rather than as separate organizations. The nicknames table 402 aids in identifying commonalities among the business personnel contained in the personnel table 300 but is not necessary for operation of the invention.

As new biographical information is added to the personnel table 300 and existing entries in the table 300 are updated, any newly mentioned affiliations are preferably added to the affiliations table 400 and possibly to the nicknames table 402. Existing entries in the affiliations table 400 or in the nicknames table 402 may also be amended as new information becomes available (e.g. by adding to the nicknames for a particular affiliation).

Figures 5, 6:
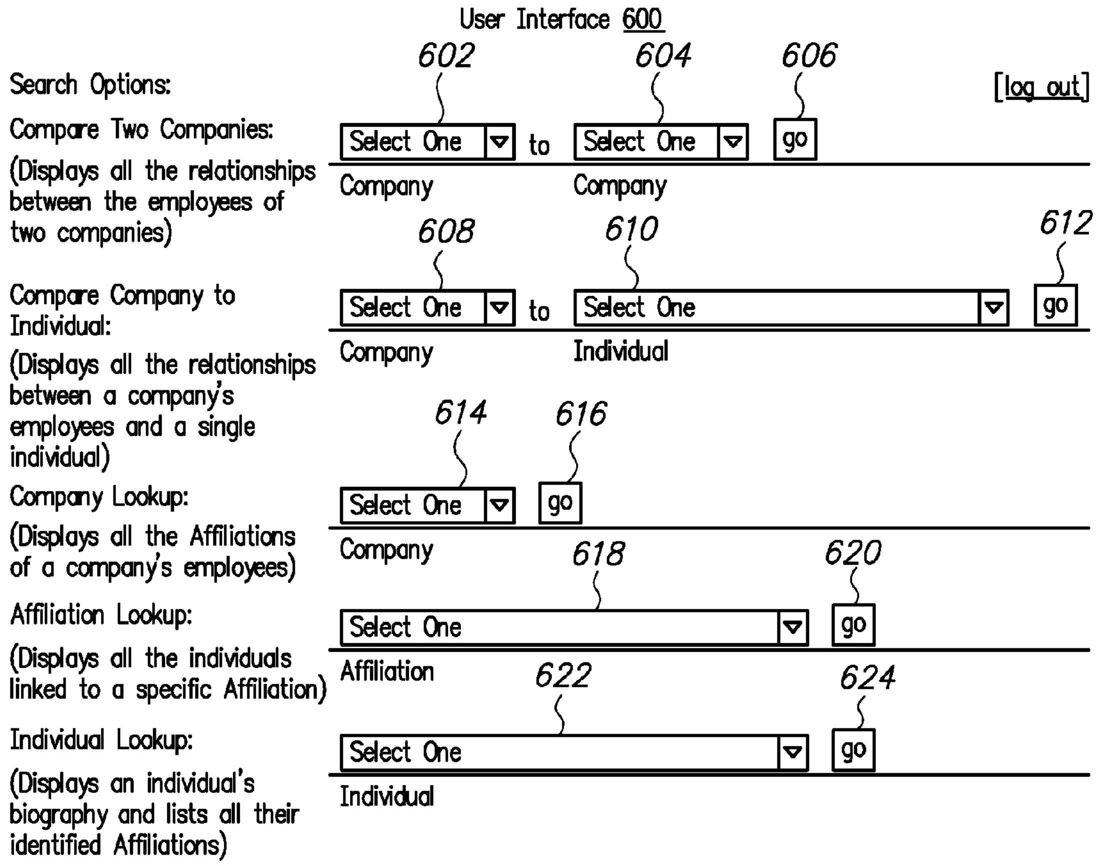
FIG. 5 illustrates a tabular data structure containing personnel (identified by a unique "Personal ID" number) and their affiliations in accordance with an embodiment of the present invention.
FIG. 6 illustrates a graphical user interface in accordance with an embodiment of the present invention.

In step 206, a personnel affiliations data structure is generated. FIG. 5 illustrates such a tabular data structure or "personnel affiliations table" 500 containing identifications of personnel and their identified affiliations in accordance with an embodiment of the present invention. As shown in FIG. 5, the table 500 includes an entry for each combination of a person contained in the table 300 of FIGS. 3A-B and each organization with which that person is affiliated. Therefore, multiple entries in the personnel affiliations table 500 may correspond to a single person identified in the personnel table 300.

To generate the data structure 500, the raw biographical information for each entry in the table 300 is examined for matches with an affiliation in the table 400. The step 206 may be performed by a software routine that searches the biographical information of the personnel table 300 to identify matches. In addition, the nicknames table 402 may be utilized to ensure that each affiliation and its nicknames are recognized and treated as a single organization rather than as separate organizations. For each match of an affiliation or nickname, an entry is added to the personnel affiliations table 500. The resulting personnel affiliations table 500 is also stored in a computer-readable storage medium (e.g. the medium 104 of FIG. 1).

To reduce errors and maximize data quality, the following rules may be followed. For example, these rules may be programmed into the software by which the invention is implemented.

When the software uses the affiliations table 400 to search the biographies it does not match to their current company which is often mentioned in their biography. This is because it can be valuable to distinguish between a person's current company and their other affiliations.

A matched affiliation may not equal the person's name. This prevents a person from being incorrectly identified as affiliated with a particular company which happens to match the person's name. For example, a person named Mr. Dell Smith would not be identified as being affiliated with Dell the computer company.

Content can be manually tagged so the software will not indicate matching. For example, person's biography may include the statement: "While Jim Smith was at Cisco, he received the Ernst and Young CFO of the year award." In this context, Ernst and Young might be tagged so it does not appear as an affiliation. This is because a user may be interested in identifying people who have worked at Ernst and Young, but not those who simply received an award from them.

The software may search from the longest to the shortest affiliation and then stop the shorter one from being identified as an affiliation. For example, a person's biography may contain the statement: "Jim Smith went to Southern Appalachia University." Otherwise, the following two affiliations might be identified: "Southern Appalachia University" and "Appalachia University." The match of "Appalachia University" would be incorrect.

Circumstances involving typographical or grammatical ambiguities may be encountered during performance of the method 200 that require special handling. In an embodiment, an ability to process these special circumstances may be included in the software. The following are examples of such circumstances. Any apostrophe (') or apostrophe-s ('s) appearing in the biographical information of the personnel table 300 is preferably ignored. For example, if an affiliation appears in a sentence as "IBM's" this is identified as a match to "IBM" (e.g. "Jim Smith was IBM's Director of Business Development."). Other such special handling includes ignoring hyphens (-) and slashes (/) and treating the word "and" as being equivalent to an ampersand symbol (&). Further, matching of affiliation names that are also commonly-used terms may be case-sensitive. For example, the term "target" may appear in the biographical information of the personnel table 300 in a sentence (e.g. Jim Smith consistently meets his sales target.") and may alternatively be used to the refer to the department store company, Target. Case-sensitive matching tends to prevent incorrect matching from occurring in such a circumstance.

Some such circumstances require more involved treatment. For example: the term "Newport" can refer to a city or to the name of a company and, in both cases, the term would be capitalized. To avoid false matches between the affiliations table 400 and the biographical information, a separate list of "problematic" affiliations may be maintained, each having a routine for handling. For example, in the case of "Newport" it may be possible to determine which meaning is meant by its context. Alternatively, occurrences of the term may be identified as one or the other by manual editing. For example, when the city is meant, the biographical information may be edited to refer to "the City of Newport." It will be apparent that other such circumstances involving ambiguities may be encountered during performance of the method 200 that require special handling.

The steps of the method 200 of FIG. 2 may be performed in succession. That is, each step may be completed before the previous step is begun such that the data structures 300 (FIGS. 3A-B), 400 (FIG. 4A), 402 (FIG. 4B) and 500 (FIG. 5) are completed in order. Alternatively, the steps may be performed such that a portion of any one or more of the data structures 300, 400, 402 and 500 is generated prior to completion of any of the other data structures.

A database containing the data structures 300, 400, 402, 500 is stored in the storage medium 104 (FIG. 1) and is portable in that it can be stored on removable media or communicated via a network. Retrieval and manipulation of the data in the database may be performed via a Structured Query Language (SQL) application. In other words, a relational database SQL backend may be employed. In a preferred embodiment, the data structures 300, 400, 402, 500 are indexed for maximum performance and use standard SQL Data Definitions. In addition, the PHP Hypertext Preprocessor programming language may be employed as a front end. Further, data processing scripts are preferably written in the programming language PERL. In a preferred embodiment, the system 100 employs the LAMP stack (Linux, Apache, MySQL and PHP). It will be apparent, however, that the invention may be implemented in another manner.

The PHP front end includes a search site and an administration site. The search site provides a user interface which allows a user to input queries. The administration site provides an interface for a system administrator to perform system administration functions. For example, the administration site allows data to be modified such as the biographical information to improve the data quality. The administration site allows such modification using PERL processing scripts that handle the special circumstances described above and so forth.

The user interface and search functionality of the present invention may be implemented using PHP scripts that run on an Apache webserver. In this case, the PHP scripts interface with the backend database via native PHP function calls.

The PHP scripts may be divided into a Page class, SimpleAuth class, Handlers library, index page and bio page. The Page class is responsible for processing html header, footer and body of output. The SimpleAuth class is responsible for handling login sessions. The Handlers library includes processes that interact with the database to perform searches. The index and bio page drive the flow of searching and displaying personnel information respectively.

The PERL processing scripts have the responsibility of importing personnel information into the database and performing matching against affiliations and nicknames to generate personnel to affiliation correlations.

The relational SQL database allows the efficient storage and retrieval of information that relates business personnel to each other using the affiliations. In order to accomplish this task, the following database schema may be used (displayed as DDL, Data Definition Language):

For the personnel table 300:

```
--
Table structure for table ‘personnel’
--
CREATE TABLE ‘personnel’ (
‘fName’ varchar(200) default NULL,
‘lName’ varchar(200) default NULL,
‘company’ varchar(255) NOT NULL default”,
‘title’ varchar(255) NOT NULL default”,
‘personnelId’ int(11) NOT NULL auto_increment,
‘bio’ text NOT NULL,
‘age’ tinyint(4) default ‘0’,
‘division’ varchar(255) default NULL,
‘rawBio’ text,
PRIMARY KEY (‘personnelId’),
UNIQUE KEY ‘uidx_personnel’ (‘fName’, ‘lName’,
   ‘company’, ‘title’)
);
```

For the affiliations table 400 and nicknames table 402:

```
--
Table structure for table ‘affiliation’
--
CREATE TABLE ‘affiliation’ (
‘affiliation’ varchar(255) NOT NULL default”,
PRIMARY KEY (‘affiliation’)
);
--
Table structure for table ‘nickname’
--
CREATE TABLE ‘nickname’ (
‘nickname’ varchar(255) NOT NULL default”,
‘affiliation’ varchar(255) NOT NULL default”,
PRIMARY KEY (‘nickname’,‘affiliation’)
);
```

For the personnel affiliations table 500:

```
--
Table structure for table ‘personnelAffiliations’
--
CREATE TABLE ‘personnelAffiliations’ (
‘affiliationDesc’ text NOT NULL,
‘affiliation’ varchar(255) NOT NULL default”,
‘personnelId’ int(11) NOT NULL default ‘0’,
KEY ‘personnelId’ (‘personnelId’),
KEY ‘affiliation_2’ (‘affiliation’,‘personnelId’)
);
```

The task of determining which entities are affiliated with each person is performed by pattern matching within text. PERL is a preferred scripting language for performing this task. The PERL scripts may use PERL database interface (DBI) to interface with the backend database.

A first PERL script may be referred to as loadBios.pl. This script may be used to parse an input file, bios.csv, which is a pipe-delimited list of personnel information in the following format:

company|division|title|firstName|lastName|age|biography

This file is iterated over and each row is compared to the existing rows in the database using the unique attributes (firstName, lastName, company and title). If there is a match, the row is updated. If there is no match, a new row is inserted.

A second PERL script may be referred to as processAffiliations.pl. This script iterates through all of the personnel in the database and parses their raw biographies for matching entries in the affiliations table. If a match is found, an entry is stored in the personnel affiliations table 500. The matching is done with regular expressions and takes into account nicknames, special characters and exception handling. In addition to determining which affiliations match in the biography, this script preferably replaces each occurrence of an affiliation or nickname within the raw biography with a hyperlink to the affiliation and places the processed information in the biography field.

An example of the regular expression that may be used to match and replace affiliations is as follows:

```
$input=~s/([\/\-])$search([\,\.\’]?)(\’s)?([\/\-])/$1$re-
    place$2$3$4/g;
```

In an embodiment, the invention allows a user to: (1) select two businesses to obtain a list of the common affiliations identified between personnel of the two business; (2) select a single business and a particular person to obtain a list of the common affiliations between the business and that particular person; (3) select a single business to obtain a list of the combined affiliations of the personnel of that business; (4) select a single affiliation to obtain a list of the personnel and businesses that are associated with that particular affiliation; and (5) select a particular person to obtain a list of that person’s identified affiliations and, optionally, their biographical information.

FIG. 6 illustrates a graphical user interface 600 in accordance with an embodiment of the present invention. The interface 600 may, for example, be displayed by the input/output devices 108 shown in FIG. 1. For selecting two businesses to obtain a list of the common affiliations between personnel of the two businesses, the interface 600 includes a selection field 602 for selecting a first of the two businesses and a selection field 604 for selecting a second of the two businesses. By placing a cursor over the down arrows associated with each of the fields 602 and 604, a list of all of the businesses in the database may appear so that the user may select from among them or the user may type in the name of the desired business. Clicking on the "go" button 606 initiates processing of the query.

This query determines "one-degree of separation" and "two-degrees of separation" between the two companies. One-degree of separation means that a single person is affiliated with the two companies. Two-degrees of separation means that two or more persons currently associated with either of the two companies also have a common affiliation.

FIGS. 7A-B illustrate a tabular data structure 700 showing results of a process of correlating commonalities among two particular organizations in accordance with an embodiment of the present invention. These results may be displayed in response to the user clicking the "go" button 606. In this example, Cisco and Oracle are being compared. As shown in FIGS. 7A-B, the table 700 includes two entries for "one degree of separation." A first of these is Deepot Chhabra who is connected to Oracle, because it is his current company, and who is also affiliated with Cisco. Therefore, Cisco and Oracle are connected via Mr. Chhabra by one degree of separation. In addition, Michael D. Capellas is connected to Cisco, because it is his current company. Mr. Capellas is also affiliated with Oracle. Cisco and Oracle are therefore connected via Mr. Capellas by one degree of separation.

The table 700 also includes several entries for "two degrees of separation." A first group of entries are persons who are each connected to Cisco or Oracle and who share a common affiliation with a third company: American Express. Particularly, Phillip Friedman's is connected to Oracle because it is his current company. Mr. Friedman is also affiliated with American Express. Bradford J. Boston is connected to Cisco because it is his current company. Mr. Boston is also affiliated with American Express. Therefore, Cisco and Oracle are connected via Mr. Friedman and Mr. Boston by two degrees of separation.

A second group of entries are persons who are each connected to Cisco or Oracle and who share a common affiliation with a third company: AT&T. This includes George Demarest, Sergio Giaolletto and Edison Perez.

To perform the comparison of two companies for one degree of separation, the following two queries may be executed:

1)

```
SELECT e.personnelId, e.fName, e.lName, e.title, ea.affiliation, e.bio, e.age".
FROM personnel e, personnelAffiliations ea
WHERE e.personnelId=ea.personnelId AND
ea.affiliation='<company A>' AND
e.company='<company B>'
ORDER BY e.lName, e.fName
```

The above query identifies personnel whose current company is company B and whose biography includes a reference to company A.

2)

```
SELECT e.personnelId, e.fName, e.lName, e.title, ea.affiliation, e.bio, e.age".
FROM personnel e, personnelAffiliations ea
WHERE e.personnelId=ea.personnelId AND
e.company='<company A>' AND
ea.affiliation='<company B>'
ORDER BY e.lName, e.fName
```

The above query identifies personnel whose current company is company A and whose biography includes a reference to company B. For each match, an entry is added to the table 700 under a heading: "One Degree of Separation."

To perform the comparison of two companies for two degrees of separation, the following steps may be performed:

First, generate an associative array of persons indexed by affiliation that are associated with company "A." This may be accomplished by the following query and related code:

```
SELECT e.personnelId, e.fName, e.lName, e.title, ea.affiliation, e.bio, e.age
FROM personnel e, personnelAffiliations ea
WHERE e.personnelId=ea.personnelId AND
e.company='<company A>'
ORDER BY ea.affiliation
$compareArray=array( );
while ($row=$gMysql→nextRow($stmt)) {
  $affiliation=$row[4];
  if (count($compareArray[$affiliation])==0) {
    $compareArray[$affiliation]=array( );
  }
  arraypush($compareArray[$affiliation],$row);
}
```

Next generate an associative array of persons indexed by affiliation that are associated with company "B." This may be accomplished by the following query and related code:

```
SELECT e.personnelId, e.fName, e.lName, e.title, ea.affiliation, e.bio, e.age
FROM personnel e, personnelAffiliations ea
WHERE e.personnelId=ea.personnelId AND
e.company='<company B>'
ORDER BY ea.affiliation
$compareArrayB=array( );
while ($row=$gMysql→nextRow($stmt)) {
  $affiliation=$row[4];
  if (count($compareArrayB[$affiliation])==0) {
    $compareArrayB[$affiliation]=array( );
  }
  array_push($compareArrayB[$affiliation], $row);
}
```

Then, iterate over the associative array for company "B" by examining the entry for each person in the array in turn. For each entry, extract the affiliation from the associative array key and search for personnel entries in the associative array for company "A" that are also indexed by that affiliation. If there is a match, this means that the personnel are associated by two degrees of separation because they both share a common affiliation. For each match, an entry is added to the table 700 under a heading: "Two Degrees of Separation."

The table 700 may then be displayed for the user.

Referring again to FIG. 6, for selecting a single business and a particular person to obtain a list of the common affiliations between the business and that particular person, the interface 600 includes a selection field 608 for selecting the business and a selection field 610 for selecting the particular person. By placing the cursor over the down arrow associated with the field 608 a list of all of the businesses in the database may appear so that the user may select from among them or the user may type in the name of the desired business. And, by placing the cursor over the down arrow associated with the field 610, a list of all of the personnel in the database may appear so that the user may select from among them or the user may type in the name of the desired person. Clicking on the "go" button 612 initiates processing of the query.

This query also determines one-degree of separation and two-degrees of separation between a particular person and a company. One degree of separation means that the individual selected has a previous or current affiliation with the specific company selected. Two degrees of separation means that the person identified in the query shares a common affiliation with another person whose current company is the company identified in the query. For example, FIG. 8 illustrates a tabular data structure 800 showing results of a process of correlating commonalities among a particular organization and a particular person in accordance with an embodiment of the present invention.

To perform the comparison of a company and an individual for one degree of separation, the following query may be executed:

```
SELECT e.personnelId, e.fName, e.lName, e.title, ea.affiliation, e.bio, e.age”.
FROM personnel e, personnelAffiliations ea
WHERE e.personnelId=ea.personnelId AND
ea.affiliation=‘<company B>’ AND
e.personnelId=‘<personnelId A>’
ORDER BY e.lName, e.fName
```

The above query identifies if the person selected has a direct affiliation with the specific company selected. For each match, an entry is added to the table 800 under a heading: “One Degree of Separation.”

To compare a person “A” with company “B” for two degrees of separation, the following steps may be performed:

First generate an associative array of person A’s affiliations indexed by affiliation. This may be accomplished by the following query and related code:

```
SELECT e.personnelId, e.fName, e.lName, e.title, ea.affiliation, e.bio, e.age
FROM personnel e, personnelAffiliations ea
WHERE e.personnelId=ea.personnelId AND
ea.personnelId=<personnelId A>
ORDER BY ea.affiliation
$compareArray=array( );
while ($row=$gMysql→nextRow($stmt)) {
  $affiliation=$row[4];
  if (count($compareArray[$affiliation])==0) {
    $compareArray[$affiliation]=array( );
  }
  array_push($compareArray[$affiliation], $row);
}
```

Next generate an associative array of persons indexed by affiliation that are associated with company “B.” This may be accomplished by the following query and related code:

```
SELECT e.personnelId, e.fName, e.lName, e.title, ea.affiliation, e.bio, e.age
FROM personnel e, personnelAffiliations ea
WHERE e.personnelId=ea.personnelId AND
e.company=‘<company B>’
ORDER BY ea.affiliation
$compareArrayB=array( );
while ($row=$gMysql→nextRow($stmt)) {
  $affiliation=$row[4];
  if (count($compareArrayB[$affiliation])=0) {
    $compareArrayB[$affiliation]=array( );
  }
  array_push($compareArrayB[$affiliation], $row);
}
```

Then, iterate over associative array for company “B” by examining the entry for each person in the array in turn. For each entry, extract the affiliation from the associative array key and search for entries in the associative array for person “A” that are also indexed by that affiliation. If there is a match, the identified personnel share an association with the same affiliation as person “A.” For each match, an entry is added to the table 800 under a heading: “Two Degrees of Separation.”

The table 800 may then be displayed for the user.

Referring again to FIG. 6, for selecting a single business to obtain a list of the combined affiliations of the personnel of that business, the interface 600 includes a selection field 614 for selecting the business. By placing the cursor over the down arrow associated with the field 614 a list of all of the businesses in the database may appear so that the user may select from among them or the user may type in the name of the desired business. Clicking on the “go” button 616 initiates processing of the query.

To generate a list of the combined affiliations of a selected company’s staff, the following query may be executed:

```
SELECT e.personnelId, e.fName, e.lName, e.title, ea.affiliation, e.bio, e.age
FROM personnel e, personnelAffiliations ea
WHERE e.personnelId=ea.personnelId AND
e.company=‘<company>’
ORDER BY ea.affiliation
```

FIG. 9 illustrates a tabular data structure 900 showing results of a process of identifying affiliations of personnel of a particular organization in accordance with an embodiment of the present invention. In the example of FIG. 9, the selected company is Chevron. Therefore, the table 900 includes an entry for each affiliation identified in the biographies of the personnel of Chevron.

The table 900 may then be displayed for the user.

Referring again to FIG. 6, for selecting a single affiliation to obtain a list of the personnel and businesses that are associated with that particular affiliation, the interface 600 includes a selection field 618 for selecting the affiliation. By placing the cursor over the down arrow associated with the field 618 a list of all of the affiliations in the database may appear so that the user may select from among them or the user may type in the name of the desired affiliation. Clicking on the “go” button 620 initiates processing of the query.

To generate a list of all of the individuals who have a selected affiliation, the following query may be executed:

```
SELECT e.personnelId, e.fName, e.lName, e.title, e.company, e.bio, e.age
FROM personnel e, personnelAffiliations ea
WHERE e.personnelId=ea.personnelId AND
ea.affiliation=‘<affiliation>’
ORDER BY e.company, e.lName
```

FIG. 10 illustrates a tabular data structure 1000 showing results of a process of identifying personnel associated with a particular affiliation in accordance with an embodiment of the present invention. In this example, the selected affiliation is United Way. Therefore, the table 1000 includes an entry for each person whose biography mentions United Way.

The table 1000 may then be displayed for the user.

Referring again to FIG. 6, for selecting a particular person to obtain a list of that person’s identified affiliations and, optionally, their biographical information, the interface 600 includes a selection field 622 for selecting the particular person. By placing the cursor over the down arrow associated with the field 622, a list of all of the personnel in the database may appear so that the user may select from among them or the user may type in the name of the desired person. Clicking on the “go” button 624 initiates processing of the query.

To generate a list of affiliations of a particular person, the following query may be executed:

```
SELECT e.fName, e.lName, e.title, e.company, e.bio, e.age
FROM personnel e
WHERE e.personnelId=<personnelId>
```

FIG. 11 illustrates a tabular data structure 1100 showing results of a process of identifying affiliations of a particular person in accordance with an embodiment of the present invention. The table 1100 includes the identified affiliations of the selected person and may also include the person's biography. In the example of FIG. 11, the selected person is John Dragoon.

The table 1100 may then be displayed for the user.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A system for processing business personnel information comprising:

a database being stored in computer-readable storage and comprising personnel information, including information for personnel of a plurality of business organizations including, for each person, the name of the person, the identity of a business organization that the person currently works for and biographical information containing any affiliations identified for the person, a table of affiliations including a list of organizations, a personnel affiliations table having a plurality of entries and each entry comprising a match between the biographical information of a person and an affiliation included in the table of the affiliations;

a processor for executing a plurality of software queries on the information contained in the database in response to input from a user; and a display device for displaying results of the queries.

2. The system according to claim 1, wherein the queries of the user comprise a selection of two business organizations and wherein the results comprise a list of common affiliations between personnel of the two business organizations.

3. The system according to claim 2, wherein the results identify a single person being affiliated with the two business organizations as one degree of separation.

4. The system according to claim 2, wherein the results identify two or more persons currently working for either of the two business organizations and that have a common affiliation as two degrees of separation.

5. The system according to claim 1, wherein the queries of the user comprise a selection of a particular business organization and a particular person and wherein the results comprise a list of common affiliations and personnel between the particular business organization and the particular person.

6. The system according to claim 5, wherein the results identify the particular person having an affiliation with the particular business organization as one degree of separation.

7. The system according to claim 5, wherein the results identify the particular person having a common affiliation with another person whose current company is the particular business organization as two degrees of separation.

8. The system according to claim 1, wherein the queries of the user comprise a selection of a particular business organization and wherein the results comprise a list of affiliations of the personnel of that business organization.

9. The system according to claim 1, wherein the queries of the user comprise a selection of a particular affiliation and wherein the results comprise a list of personnel and business organizations associated with the particular affiliation.

10. The system according to claim 1, wherein the queries of the user comprise a selection of a particular person and wherein the results comprise a list of identified affiliations of the particular person.

11. The system according to claim 1, further comprising a table of nicknames for the affiliations.

* * * * *